Patented July 22, 1947

2,424,483

UNITED STATES PATENT OFFICE 2,424,483

CYANINE DYE INTERMEDIATES, DYES, AND THEIR PREPARATION

Edmund B. Middleton, Woodbridge, and George A. Dawson, Stelton, N. J., assignors to E. I. du Pont de Nemours & Company, Wilmington, Del., a corporation of Delaware No Drawing. Application November 18, 1942, Serial No. 466,056

3 Claims. (Cl. 260—240)

This invention pertains to the preparation of new heterocyclic organic compounds. More particularly, it pertains to polynuclear heterocyclic organic compounds. Still more particularly it relates to polynuclear heterocyclic compounds containing an aromatic nuclei and at least two heterocyclic nuclei, one of which is a heterocyclic nitrogen nuclei and to their preparation and use. The invention also relates to the preparation of cycloammonium salts and dyes from such compounds. In another aspect, it relates to photographic elements and compositions containing such dyes.

This invention has for an object the preparation of new organic compounds. A further object is to provide new and useful chemical intermediates. Another object is to provide a new class of photographic sensitizing dyes. Another object is to provide new and useful photographic silver halide emulsions which have abnormal sensitivities conferred thereon. A further object is to provide a new use for thiophenes. Other objects include the provision of new cycloammonium salts, dye condensation reactions, and dyes, and a general advance in the art.

It has been found that a new and useful class of organic compounds can be prepared by converting a compound of the formula:

I 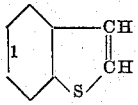

wherein the nucleus designated as 1 is a benzene nucleus into a nitrobromo derivative of the general formula:

II 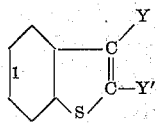

wherein one of the Y's is a nitro group (NO₂) and the other bromine. The compounds of Formula II can be prepared by nitrating and brominating a heterocyclic compound of Formula I in any desired order. When the bromination is effected first, Y is bromine; however, if nitration is effected first Y is NO₂ and Y' is bromine.

In each of Formulae I and II the benzene nucleus (i. e., constituting the phenylene radical) may be substituted by various groups which are not affected by the bromination and nitration reactions. Thus, hydrocarbon groups such as alkyl, e. g., methyl, ethyl, isopropyl, dodecyl, etc.; aryl, e. g., phenyl, naphthyl; aralkyl, e. g., benzyl, menaphthyl and cycloalkyl, e. g., cyclohexyl groups; halogen atoms, amino groups, ether groups, etc., may be present.

The compounds of Formula II when treated with an alkaline disulfide form new classes of isomeric compounds of the following formulae:

III (a) 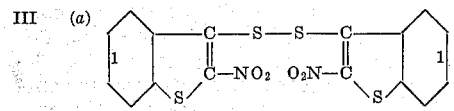

(b) 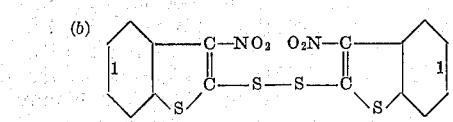

wherein the ring designated 1 is a benzene ring which may be substituted as set forth in the preceding paragraph.

In a further aspect of the invention it has been found that when the compounds of Formulae III (a) or (b) are reduced with a reducing metal such as metallic zinc in the presence of acetic anhydride, they are converted to new and useful compounds which in one of their tautomeric compounds have the formulae:

IV (a) 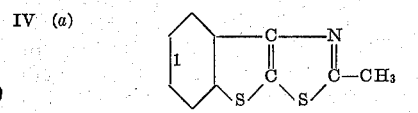

and (b) 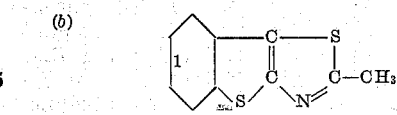

The compounds of Formulae IV (a) and (b) have a reactive methyl group in the alpha position to the heterocyclic nitrogen atom and thus provide a new class of intermediates which have considerable value in the chemical arts. In accordance with one important aspect of this invention they can be converted into cycloammonium salts and subjected to a dye condensation reaction either stepwise or substantially simultaneously. The compounds, for example, can be converted into cycloammonium salts by reaction with a quaternary salt-forming reagent such as an alkyl salt or an ester of a monohydric alcohol with a monovalent acid, e. g., methyl and ethyl chlorides, bromides, iodides, sulfates, nitrates, acetates, paratoluene sulfonates, sulfamates, perchlorates, etc., prior to or simultaneously with a dye condensation reaction.

The resulting dyes have been found to modify the normal sensitivity of silver halide emulsions and constitute effective sensitizing agents. When used to vary the sensitivity of photosensitive silver salts, they need only be brought into operative contact with the silver salts. This can be accomplished by dispersing the compounds in the silver halide coating compositions or emulsions by bathing or impregnating the layer with the dyes. It is convenient to add the dyes to the emulsions in the form of solutions in appropriate solvents. The solvent should, of course, be compatible with the emulsion, substantially free from any deleterious effect on the light sensitive materials in the emulsions and capable of dissolving the dyes. Methanol ethanol and acetone are satisfactory solvents for the dyes. The sensitizing dyes are advantageously incorporated in the finished, washed emulsions and should be uniformly distributed throughout the emulsions.

The concentration of the dyes in photosensitizing compositions or emulsions can vary widely, e. g., from about 2 to 100 mg. per liter of ordinary flowable gelatino-silver-halide emulsion. The concentration of dye will vary according to the type of light sensitive material employed in the emulsion and according to the effects desired. The suitable and most economical concentration for any given emulsion may be determined by those skilled in the art, upon making the tests and observations customarily employed in the art of emulsion-making. To prepare a gelatino-silver-halide emulsion, the following procedure is satisfactory: A quantity of the dye is dissolved in methyl alcohol or acetone and a volume of this solution (which may be diluted with water) containing from 2 to 100 mg. of dye is slowly added to 1000 cc. of a flowable gelatino-silver-halide emulsion with stirring. Stirring is continued until the dye is thoroughly incorporated in the emulsion. Ordinarily from 10 to 20 mgs. of the dyes per liter of emulsion suffice to produce the maximum effect.

The invention will be further illustrated, but is not intended to be limited by the following examples:

*Example I.*—Forty-five grams of benzothiophene were dissolved in 108 cc. of acetic acid and cooled to 15° C. A mixture of 68 ccs. of fuming nitric acid and 68 ccs. of acetic acid were then added dropwise to the above solution with stirring. The solution was allowed to stand for about 16 hours at a temperature of approximately 5° C. The solution was then poured onto crushed ice and neutralized slowly using first sodium acetate and then adding only enough sodium carbonate to make it faintly alkaline. The resulting solution was then steam distilled and the distillate extracted with ether. The ether extract was dried over anhydrous potassium carbonate and the ether then evaporated off. Twenty-eight grams of a golden brown oil were obtained which was believed to have the following formula:

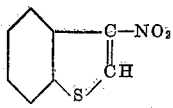

*Example II.*—Twenty-eight grams of beta nitro thionaphthene prepared as described in Example I were dissolved in 120 ccs. of acetic acid and the solution brominated at room temperature by adding dropwise with stirring 25 grams of bromine dissolved in 50 ccs. of acetic acid. The solution was then placed on a steam bath for 48 hours, at the end of which time it was heated to reflux temperature for 1 hour. The solution was then steam distilled and the distillate extracted with ether and dried over anhydrous potassium chloride. The ether was then removed by evaporation, leaving 26 grams of a yellow-brown oil, that crystallized on cooling. The resulting compound was believed to be 2-brom-3-nitro thionaphthene and to have the following formula:

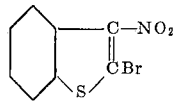

*Example III.*—Twenty-six grams of 2-brom-3-nitro thionaphthene prepared as described in Example II were dissolved in 100 ccs. of alcohol and placed in a three-neck flask equipped with a stirrer, condenser and dropping funnel. The solution was heated to reflux temperature and a solution of 14.3 grams of sodium sulfide, $Na_2S.9H_2O$; 1.8 grams of powdered sulfur, 15 ccs. of water, and 5 ccs. of alcohol added dropwise with stirring. Stirring was then discontinued but reflux distillation is continued for the next 16 hours after which the alcohol was removed by distillation leaving 32½ grams of a dark brown oil believed to be 3-3' dinitro-2-2' thionaphtheno disulfide recovered which corresponds to the following formula:

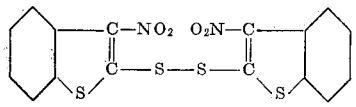

*Example IV.*—Thirty-two and five-tenths grams of 3-3' dinitro 2-2' dithionaphtheno disulphide, obtained in accordance with the procedure of Example III, were dissolved in 300 ccs. of acetic anhydride. The solution was then heated to reflux temperature and reduced by adding small portions of zinc dust from time to time until a 50% excess of the calculated molecular equivalent had been added. After reduction was completed, reflux distillation was continued for one hour and the mixture was cooled. Solid materials were then removed by filtration. The desired product was obtained from the filtrate by the following schedule of distillation. The first fraction up to 139° C. at atmospheric pressure is discarded. Vacuum distillation is then begun at 15 mm. pressure and the fraction up to 110° C. is discarded also. The second fraction from 110° C. to 220° C. is collected and then redistilled selecting the fraction from 180° to 210° C. The yield is 6 grams of a light yellow oil with a pleasant odor which crystallizes partially on cooling. It was believed to be 2-methyl-alpha-benzothiophenothiazole corresponding to the following formula:

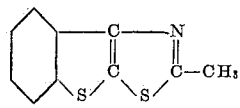

*Example V.*—One gram of 2 methyl-alpha-benzothiophenothiazole prepared as described in Example IV, and 0.7 gram diethyl sulfate are heated together for two hours at 118° C. The mixture is then cooled and the melt dissolved in 15 cc. of dry pyridine to which has been added 3 cc. of ethyl-o-formate and the solution thus obtained is heated to reflux temperature for one hour. A magenta color develops in the solution.

To the hot solution there is then added, in amounts slightly in excess of the calculated molecular equivalent, a saturated solution of ammonium chloride after which the mixture is cooled. The desired product is precipitated and is collected by filtration. The residue remaining on the filter is recrystallized several times from alcohol. A yield of 0.05 gram of a black amorphous powder is obtained believed to correspond to the following formula:

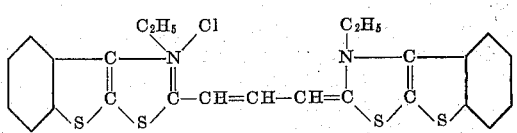

Thirty milligrams of this dye were dissolved in 80 ccs. of alcohol to give an ink-blue solution which was added to 1000 ccs. of a gelatino-silver halide emulsion consisting of approximately 33 grams of gelatine and 56 grams of mixed silver halide (70% silver chloride and 30% silver bromide). The emulsion was then coated on film base and sensitometrically evaluated in the manner known in the art. The addition of the new dye was found to extend the sensitivity powerfully to 7000 Å. with maxima at 5400 Å. and 6000 Å.

*Example VI.*—Forty-four grams of thionaphthene were dissolved in 250 ccs. of chloroform and treated dropwise with 53 grams of bromine dissolved in 125 cc. of chloroform at room temperature. The mixture was allowed to stand for 16 hours, and the flask was then swept out with carbon dioxide gas until no more hydrobromic acid remained in the container. The chloroform mixture was then added to a liter of water and shaken well for some time. It was allowed to settle and the chloroform layer separated and dried over anhydrous potassium chloride. The chloroform was evaporated off and the residual oil distilled at 15 millimeters of mercury. The fraction boiling from 146–156° C. being taken as the desired product. The yield was 57 grams, the compound was thought to be 3-brom thionaphthene having the following formula:

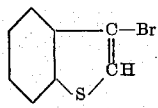

*Example VII.*—The 3-brom thionaphthene prepared as described in Example VI was converted to 2-nitro-3-bromo thionaphthene by the following procedure. Eleven grams of 3-brom thionaphthene were dissolved in 40 ccs. of glacial acetic acid and the mixture cooled to 15° C. A mixture of 15 ccs. of fuming nitric acid and 15 ccs. of acetic acid were then added dropwise while stirring, the temperature not being allowed to rise above 20° C. After standing for 15 hours at a temperature of approximately 5° C. yellow crystals were precipitated from the solution in addition to those which separated with nitration. The solid substance is collected on a filter and recrystallized from alcohol as yellow needle-like crystals. The product has a melting point of 160–161° C. The yield was 3 grams of 2-nitro-3-bromo-thionaphthene having the following formula:

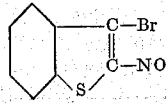

*Example VIII.*—Sixteen grams of 2-nitro-3-brom-thionaphthene prepared as described in Example VII, were dissolved in 200 ccs. of alcohol and heated to reflux with stirring. A solution of 7.72 grams of sodium sulfide, Na₂S.9H₂O and 0.92 gram of sulfur dissolved in a mixture of 40 ccs. of water and 20 ccs. of alcohol was then added dropwise to the mixture. Reflux distillation was continued for 16 hours at the end of which time the solution is cooled. Twelve grams of an orange colored crystalline compound are obtained. It was believed to be 2-2′ dinitro 3-3′ thionaphtheno disulfide corresponding to the following formula:

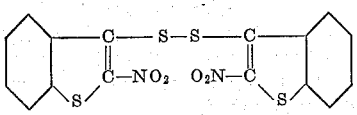

*Example IX.*—Twelve grams of 2-2′ dinitro 3-3′ thionaphtheno disulfide prepared as described in Example VIII were dissolved in 100 ccs. of acetic anhydride and heated to reflux temperature. Reduction was then accomplished by the addition from time to time of small portions of zinc until a quantity had been added 50% in excess of the calculated molecular equivalent required. Following reduction, reflux distillation was continued for one hour. The solution was then cooled and filtered to remove all solid material. The filtrate was distilled according to the schedule set out in Example IV, the desired material in this case, however, being collected as the fraction distilling at 18 millimeters of mercury between the temperatures 185 and 220° C. The yield was 4 grams of an almost colorless oil that crystallized on cooling. It was believed to be 2-methyl-beta-thio-naphthenethiazole having the following formula:

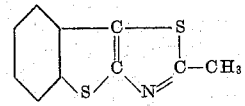

*Example X.*—One gram of 2-methyl-beta-benzothiophenothiazole prepared as described in Example IX, and 0.6 of dimethyl sulfate were heated together for 2 hours at 110–115° C. A crystalline solid was obtained which was dissolved in 10 ccs. of dried pyridine containing 2 ccs. of ethyl-o-formate. The solution was subjected to reflux distillation for one hour. To the still warm blue colored solution there was then added a slight excess of the calculated molecular equivalent of ammonium chloride in the form of a saturated solution. Upon cooling a dye precipitated which was collected by filtration and recrystallized several times from alcohol. 0.05 gram of the purified dye obtained which is thought to have the following formula:

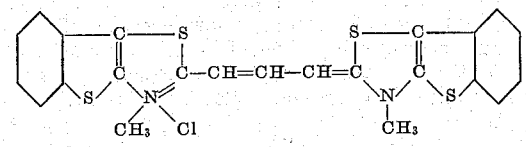

Thirty milligrams of the above dye were dissolved in 80 ccs. of alcohol to give a blue-green solution which was added to 1 liter of a gelatino-silver-halide emulsion similar to that employed in Example V. The dye was found to extend the sensitivity of the emulsion powerfully to 7200 Å. with a maximum at 6850 Å. with a gap between 4600 Å. and 5400 Å. The same quantity of dye added to 1 liter of an iodo-bromide emulsion containing 57 grams of mixed silver halides (5% silver iodide and 95% silver bromide) and 88 grams of gelatine extended the sensitivity to 7200 Å. with a maximum at 6950 Å.

*Example XI.*—One gram of 2-methyl-alpha benzothiophenothiazole, prepared as described in Example IV, 0.65 gram of diethyl sulfate and 1.46 grams of 2 methyl mercapto quinoline ethyl iodide were mixed together in a small vessel and heated at 110° C. for 2 hours. At the end of this time the resulting material was cooled, dissolved in 30 cc. of absolute alcohol and heated to reflux. Six-tenths of a gram of triethylamine was then added and reflux distillation continued for thirty minutes, an orange-colored solution being formed. On cooling the dye crystallized readily and was purified by recrystallizing several times from alcohol. The dye was thought to correspond to the following formula:

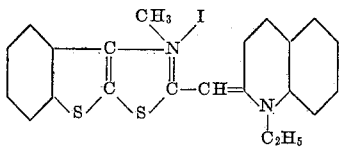

Thirty milligrams of the dye were dissolved in 80 ccs. of alcohol to give an orange solution which was added to 1 liter of the emulsion described in Example V. The sensitivity of the emulsion was powerfully extended to 6000 Å. with a maximum at 5500 Å. The same quantity of dye added to 1 liter of the iodo-bromide emulsion described in Example X extended the sensitivity to 5800 Å. with a maximum at 5600 Å.

In the bromination step it is desirable to use sufficient bromine or to carry out the process until one molecule of bromine is introduced into the compound. This is fairly easy to control. Similarly, the nitration reaction should be controlled somewhat as to duration and amount so that only one nitro group is introduced into the compound.

Other metal reducing agents other than the finely divided zinc of the examples can be used. Additional suitable agents include iron and tin.

Both symmetrical and unsymmetrical compounds may be prepared either (a) by condensing two or more molecular equivalents of the same 2-methyl-benzothiophenothiazole salt or base alone in the presence of an acid binding agent with the addition of a salt-forming agent, if necessary, or (b) by condensing one or more molecular equivalents of the 2-methyl-benzothiophenothiazole salt or base with one or more molecular equivalents of some other heterocyclic nitrogen compound salt or base containing a reactive group such as is commonly employed in cyanine dye reactions. In the last mentioned case a salt-forming agent, such as an alkyl salt, should be admixed with the bases so that salt formation and condensation may take place. More specifically, alpha and beta benzothiophenothiazoles containing a reactive methyl group in the alpha position to the nitrogen atom may be condensed with any heterocyclic base of the following general formula:

wherein A represents a reactive group capable of entering into cyanine dye condensations, and Y represents the non-metallic atoms necessary to complete a 5-membered heterocyclic nucleus, for example, a 5-membered heterocyclic nucleus containing at least one nuclear trivalent nitrogen atom and another divalent non-metallic atom or group such as oxygen, sulfur, selenium, etc., an imino group (—NH—) or a dialkyl methenyl group, e. g.,

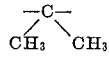

By heterocyclic nucleus, substituted and unsubstituted heterocyclic rings such as thiazoles, benzothiazoles, benzoaxozoles, naphthiazoles, anthracenothiazoles, etc., are comprehended. Y may also represent the non-metallic atoms necessary to complete a six-membered heterocyclic nucleus such as a six-membered heterocyclic nucleus containing but one nuclear non-metallic atom other than carbon, as for example, pyridine, quinoline, or naphthquinoline. Suitable reactive groups include alkylmercapto and selenomercapto, methyl, acetanilide, halogeno, e. g., iodo, amino, etc.

Heterocyclic compounds capable of reacting to form mercocyanine dyes may also be reacted with the 2-methylthionaphthenothiazole derivatives hereof. Examples of such compounds correspond to the following general formula:

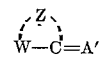

where A' is an intracyclic reactive methylene group capable of entering into cyanine dye condensations, and wherein W is either $=C=S$, $=C=Se$, $=C=Te$, or $=C=O$ and Z represents the non-metallic atoms necessary to complete a 5-membered heterocyclic nucleus containing two nuclear non-metallic atoms other than carbon, at least one of which is trivalent nitrogen and another of which is divalent when other than nitrogen, i. e., thiazoles, an oxazolone, an imidazolone, a pyrazolone, etc. nucleus providing, for example, compounds such as rhodanines, 2-thio-2,4 (3,5) oxazoledione, hydantoins and nitrogen substituted derivatives, pyrazolones and thiopyrazolones. In addition Z represents the non-metallic atoms necessary to complete a six-membered heterocyclic nucleus, for example, a six-membered heterocyclic nucleus containing two nuclear trivalent nitrogen atoms and four nuclear carbon atoms such as barbituric acids. The above mentioned merocyanine dyes may then be converted into compounds containing a plurality of heterocyclic keto nuclei according to the quaternarization and condensation reactions described in British Patents 487,051 and 489,335. The other types of benzothiophenothiazole cyanine dyes may also be converted to polymeric compounds, particularly by the process of Wilson application Serial No. 409,433, filed September 3, 1941.

Styryl dyes can be made by reacting the foregoing quaternary salts, e. g., of 2-methyl alpha- and beta-benzothiophenothiazoles with dialkyl-aminobenzaldehydes in the presence of basic catalytic agents, e. g., pyridine, piperidine, etc. Isocyanines can be made by reaction of such salts by reaction of the foregoing quaternary salts with quaternary salts of quinoline in the presence of alcohol and a strong base, e. g., caustic soda. Pseudo cyanines can be made by condensation of the salts with quinoline salts containing a reactive halogen group, e. g., iodine or an alkyl mercapto group.

The intermediate products of this invention are useful as organic intermediates and especially for the preparation of dyes. The cyanine dyestuffs prepared from the intermediates of this invention constitute a new group of sensitizing agents which are useful in photography as sensitizing dyes. They are particularly useful as sensitizing dyes for photo-lithographic silver halide emulsions and in emulsion layers of elements used for color photography. They are compatible in photographic emulsions with immobile or non-diffusing dye intermediates or color formers used for color coupling development and/or azo coupling processes of color photography. They may also be employed as screening or filter dyes in multi-layer films or as anti-halation dyes for backing layers. Certain of the compounds of the present invention may be used as azo dyestuff intermediates.

Certain of the dyestuffs of the present invention have the advantage of sensitizing a photographic silver halide emulsion to the blue and red regions of the spectrum while conferring on the emulsion no sensitivity to the green portion of the spectrum. Thus, some of the cyanine dyes disclosed herein are valuable as the so-called "green-blind" sensitizers. Green-blind sensitizers are advantageously employed in color photography and may be particularly useful because emulsions containing them can be readily handled in the presence of a bright green safelight.

Photographic emulsions containing the above dyes form the subject matter of our copending application Serial Number 540,898, filed June 17, 1944.

As many apparently widely different embodiments of this invention may be made without departing from the spirit and scope thereof it is to be understood that the invention is not to be limited except as defined by the appended claims.

We claim:
1. The cyanine dyes which in one of their tautomeric forms have the formula

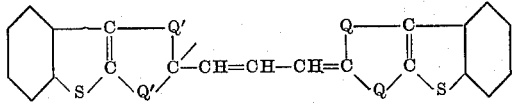

wherein one of the radicals Q is divalent sulfur and the other is pentavalent nitrogen, one of the radicals Q' is divalent sulfur and the other is trivalent nitrogen, each of the nitrogen atoms have attached thereto an alkyl radical, the pentavalent nitrogen atom also having attached thereto the negative radical of an acid, and the free bond being attached to the latter nitrogen atom.

2. The cyanine dyes of the formula:

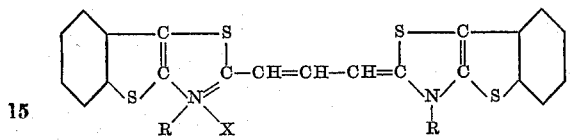

wherein R is a hydrocarbon radical and X is the negative radical of an acid.

3. The cyanine dyes of the formula

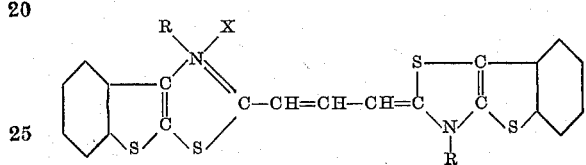

where R is a hydrocarbon radical and X is the negative radical of an acid.

EDMUND B. MIDDLETON.
GEORGE A. DAWSON.

REFERENCES CITED

The following references are of record in the file of this patent:

UNITED STATES PATENTS

| Number | Name | Date |
|---|---|---|
| 2,301,361 | Brooker et al. | Nov. 10, 1942 |
| 2,304,112 | Middleton | Dec. 8, 1942 |
| 2,216,441 | Keyes | Oct. 1, 1940 |
| 2,270,378 | Middleton et al. | Jan. 20, 1942 |